(12) United States Patent
Oota

(10) Patent No.: US 8,189,066 B2
(45) Date of Patent: May 29, 2012

(54) IMAGE PROCESSING APPARATUS, IMAGE PROCESSING METHOD, AND COMPUTER-READABLE MEDIUM

(75) Inventor: Makoto Oota, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 243 days.

(21) Appl. No.: 12/756,952

(22) Filed: Apr. 8, 2010

(65) Prior Publication Data

US 2010/0265366 A1 Oct. 21, 2010

(30) Foreign Application Priority Data

Apr. 15, 2009 (JP) .................................. 2009-099064
Feb. 17, 2010 (JP) .................................. 2010-032698

(51) Int. Cl.
*H04N 5/235* (2006.01)
*H04N 5/228* (2006.01)
*G06K 9/00* (2006.01)
*G06K 9/40* (2006.01)

(52) U.S. Cl. ..................... 348/222.1; 348/241; 382/162; 382/167

(58) Field of Classification Search ............... 348/222.1, 348/241; 382/162, 167, 163
See application file for complete search history.

(56) References Cited

U.S. PATENT DOCUMENTS

| | | | |
|---|---|---|---|
| 6,853,400 B1 | 2/2005 | Matama | |
| 6,914,628 B1 | 7/2005 | Kuwata et al. | |
| 7,630,546 B2 * | 12/2009 | Ishiga | 382/167 |
| 2008/0181495 A1 * | 7/2008 | Spampinato et al. | 382/167 |
| 2009/0052769 A1 * | 2/2009 | Kang et al. | 382/162 |
| 2010/0303352 A1 * | 12/2010 | Nobuoka | 382/167 |
| 2010/0309320 A1 * | 12/2010 | Sakaida | 348/207.1 |

FOREIGN PATENT DOCUMENTS

| | | |
|---|---|---|
| JP | 2000-076428 A | 3/2000 |
| JP | 2003-102027 A | 4/2003 |

\* cited by examiner

*Primary Examiner* — Tuan Ho
*Assistant Examiner* — Shahbaz Nazrul
(74) *Attorney, Agent, or Firm* — Canon U.S.A., Inc. I.P. Division

(57) ABSTRACT

An image processing apparatus includes an evaluation value calculation unit configured to acquire an evaluation value from image data, a reduction coefficient calculation unit configured to calculate a reduction coefficient based on the evaluation value, a reduction unit configured to subject the image data to image processing to reduce color bleeding in a target area in the image data based on the reduction coefficient, and a size change unit configured to change the size of the image data. The reduction coefficient calculation unit calculates the reduction coefficient to reduce the color bleeding in a target area in the image data when the evaluation value exceeds a threshold. The threshold is set so that the range of the evaluation value where the reduction coefficient is not calculated when the size change unit sets the size of the image data to a second value larger than a first value is made wider than the range of the evaluation value where the reduction coefficient is not calculated when the size change unit sets the size of the image data to the first value.

13 Claims, 20 Drawing Sheets

FIG. 4A

| -1 | 0 | 1 |
|---|---|---|
| -2 | 0 | 2 |
| -1 | 0 | 1 |

FIG. 4B

| -1 | -2 | -1 |
|---|---|---|
| 0 | 0 | 0 |
| 1 | 2 | 1 |

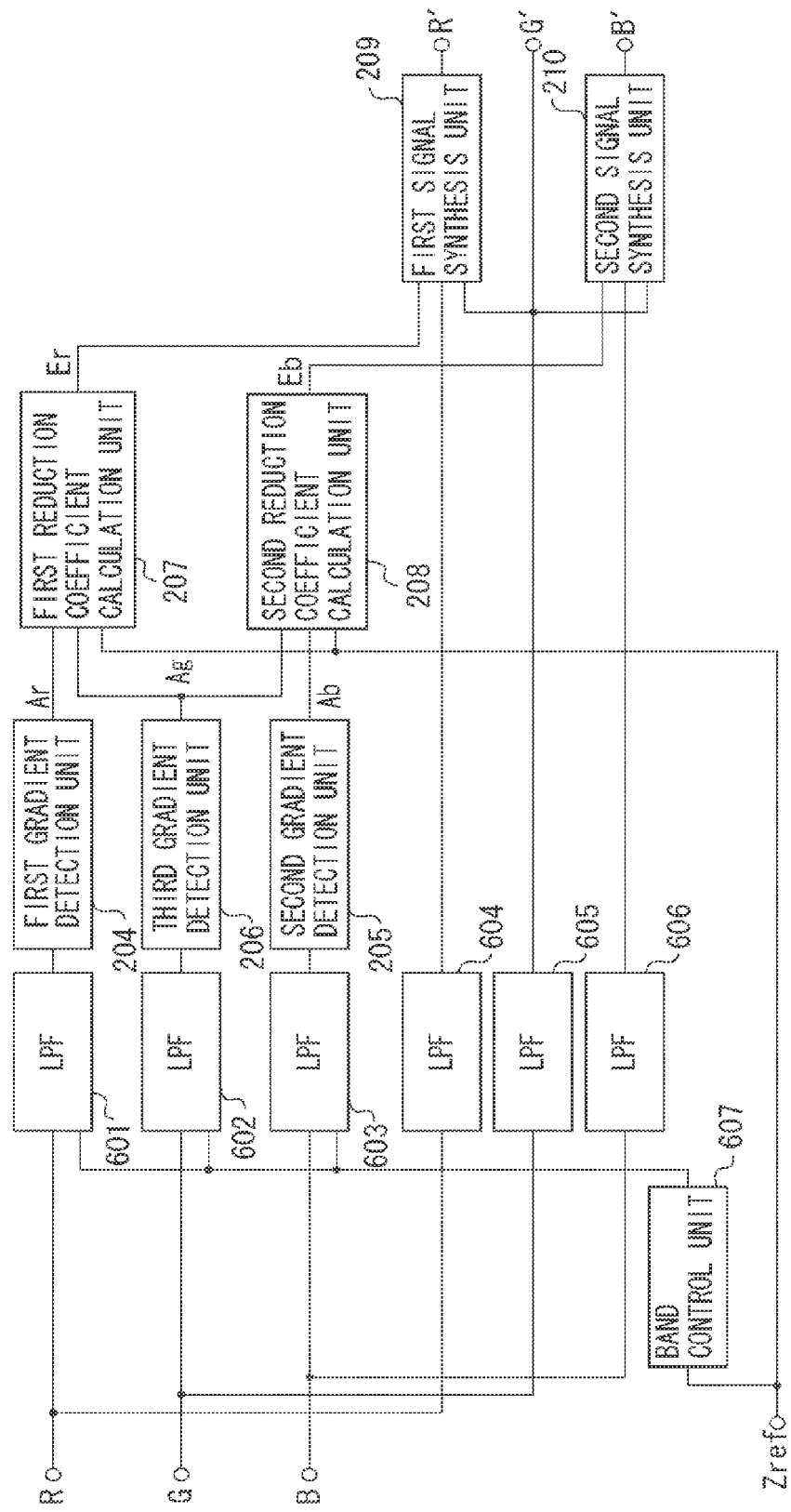

IMAGE PROCESSING APPARATUS, IMAGE PROCESSING METHOD, AND COMPUTER-READABLE MEDIUM

BACKGROUND OF THE INVENTION

1. Field of the Invention

The present invention relates to an image processing apparatus and an image processing method and, in particular, to an image processing apparatus, an image processing method and a computer-readable medium storing a program for reducing color bleeding.

2. Description of the Related Art

A digital video camera and a digital camera available recently on the market have used image sensors with a large number of pixels to provide a high picture-quality image.

Color bleeding, which occurs by the influence of chromatic aberration resulting from a difference in an image forming position for each optical wavelength for the reasons of the miniaturization of a pixel and the use of a miniature lens, tends to appear on an image. Furthermore, the color bleeding appears due to the generation of a false color signal in interpolation because color filters with a plurality of colors provided correspondingly with the pixels of a solid-state image sensor are arranged in a mosaic form.

A method for reducing the color bleeding in a captured image has been proposed. Japanese Patent Application Laid-Open No. 2000-076428 discusses a technique, which identifies a lens used for capturing an image, reads aberration information, produces a correction parameter, and moves coordinates of a color signal to be corrected according to the correction parameter.

A color bleeding characteristic, however, complicatedly varies with an image-height position from the center of an optical axis to a target pixel, a zoom lens position, the opening diameter of an iris, and a focus-lens position. In a configuration for reading the aberration information of a lens as discussed in Japanese Patent Application Laid-Open No. 2000-076428, aberration information needs to be stored for each image-height position, zoom lens position, opening diameter of an iris, focus-lens position, and kind of a lens.

For this reason, a memory with a large capacity is required to store the aberration information. Since the area where the color bleeding is caused by interpolating a color signal output from an image sensor on which color filters with a plurality of colors are arranged in a mosaic form depends on an object to be captured, the amount of movement in coordinates of a color signal cannot be identified in advance.

There has been proposed a technique for extracting an area where the color bleeding seems to be caused from an image instead of reading the previously stored aberration information of a lens, and reduces the color bleeding in the area. Japanese Patent Application Laid-Open No. 2003-102027 discusses a technique which detects a difference between the rates of change in two color components from an image, determines an area greater in the difference as an area where the color bleeding is caused, and reduces the color bleeding.

However, it is difficult to completely eliminate an erroneous determination if an area where the color bleeding is caused is determined from an image without reading the stored aberration information of a lens.

In a configuration in which a difference between the rates of change in two color components is detected, as discussed in Japanese Patent Application Laid-Open No. 2003-102027, if an object itself has a pattern satisfying such a condition, while the color bleeding is not caused, the object can be determined as a color-bleeding area. For this reason, even if color bleeding is not caused in an area, the density of color in the area is lowered or signals of the area may be replaced with signals of pixels surrounding the area.

This causes a problem that the object affects the determination result even in a configuration of determining an area where the color bleeding is caused, and an extent of the color bleeding from the luminance component and the color component of an image other than in the configuration discussed in Japanese Patent Application Laid-Open No. 2003-102027.

Strict conditions for determining a color bleeding area need to be set to avoid such a problem. However, simply setting the strict conditions for determining a color bleeding area increases areas, which are not determined as a color bleeding area irrespective of areas where the color bleeding is caused, which does not contribute enough to improve picture quality.

When an image subjected to a process for reducing the color bleeding is subjected to an expansion process, both of the area where the density of color is reduced due to erroneous determination even though the color bleeding is not caused and the area where the density of color is not reduced even though the color bleeding is caused, are expanded. The area where the density of color is reduced even though the color bleeding is not caused is probably more conspicuous by its unnaturalness than the area where the color bleeding remains.

This may occur when an image is subjected to a compression process. In the area where the density of color is reduced even though the color bleeding is not caused, the lower the compression rate of an image, the clearer and the more conspicuous the unnatural area of the image.

In view of the above described problems, there is a need for an image processing apparatus and an image processing method capable of effectively correcting the color bleeding without the color bleeding being made conspicuous even if an erroneous correction is performed.

SUMMARY OF THE INVENTION

According to an aspect of the present invention, an image processing apparatus includes an evaluation value calculation unit configured to acquire an evaluation value from image data, a reduction coefficient calculation unit configured to calculate a reduction coefficient based on the evaluation value, a reduction unit configured to subject the image data to image processing to reduce color bleeding in a target area where the color bleeding is to be reduced in the image data based on the reduction coefficient, and a size change unit configured to change the size of the image data, wherein the reduction coefficient calculation unit is configured to calculate the reduction coefficient so that the color bleeding is reduced in a target area where the color bleeding is to be reduced in the image data when the evaluation value exceeds a threshold, and wherein the threshold is set so that the range of the evaluation value where the reduction coefficient is not calculated in the case where the size change unit sets the size of the image data to a second value larger than a first value is made wider than the range of the evaluation value where the reduction coefficient is not calculated in the case where the size change unit sets the size of the image data to the first value.

According to another aspect of the present invention, an image processing apparatus includes an evaluation value calculation unit configured to acquire an evaluation value from image data, a reduction coefficient calculation unit configured to calculate a reduction coefficient based on the evaluation value, a reduction unit configured to subject the image data to image processing to reduce color bleeding in a target area where the color bleeding is to be reduced in the image data based on the reduction coefficient, and a size change unit configured to change the size of the image data, wherein the reduction coefficient calculation unit is configured to calculate the reduction coefficient so that the extent of which the color bleeding is reduced in an area to be reduced in the case where the size change unit sets the size of the image data to a first value smaller than a second value is made greater than the extent of which the color bleeding is reduced in an area to be reduced in the case where the size change unit sets the size of the image data to the second value, even if the evaluation value acquired from the image data is the same.

According to yet another aspect of the present invention, an image processing method includes acquiring an evaluation value from image data using an evaluation value calculation unit, calculating a reduction coefficient based on the evaluation value using a reduction coefficient calculation unit, subjecting the image data to image processing to reduce color bleeding in a target area where the color bleeding is to be reduced in the image data based on the reduction coefficient using a reduction unit, and changing the size of the image data using a size change unit, wherein the reduction coefficient calculation unit is configured to calculate the reduction coefficient so that the color bleeding is reduced in a target area where the color bleeding is to be reduced in the image data when the evaluation value exceeds a threshold, and to set the threshold so that the range of the evaluation value where the reduction coefficient is not calculated in the case where the size change unit sets the size of the image data to a second value larger than a first value is made wider than the range of the evaluation value where the reduction coefficient is not calculated in the case where the size change unit sets the size of the image data to the first value.

According to yet another aspect of the present invention, an image processing method includes acquiring an evaluation value from image data using an evaluation value calculation unit, calculating a reduction coefficient based on the evaluation value using a reduction coefficient calculation unit, subjecting the image data to image processing to reduce color bleeding in a target area where the color bleeding is to be reduced in the image data based on the reduction coefficient using a reduction unit, and changing the size of the image data using a size change unit, wherein the reduction coefficient calculation unit is configured to calculate the reduction coefficient so that the extent to which the color bleeding is reduced in an area to be reduced in the case where the size change unit sets the size of the image data to a first value smaller than a second value is made greater than the extent to which the color bleeding is reduced in a target area in the case where the size change unit sets the size of the image data to the second value, even if the evaluation value acquired from the image data is the same.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A and 4B illustrate an example of a differential filter of the first gradient detection unit according to the first exemplary embodiment of the present invention.

FIG. 10 is a block diagram illustrating an example of a configuration of a color bleeding reduction circuit according to a second exemplary embodiment of the present invention.

DESCRIPTION OF THE EMBODIMENTS

Various exemplary embodiments, features, and aspects of the invention will be described in detail below with reference to the drawings.

Figure 1:
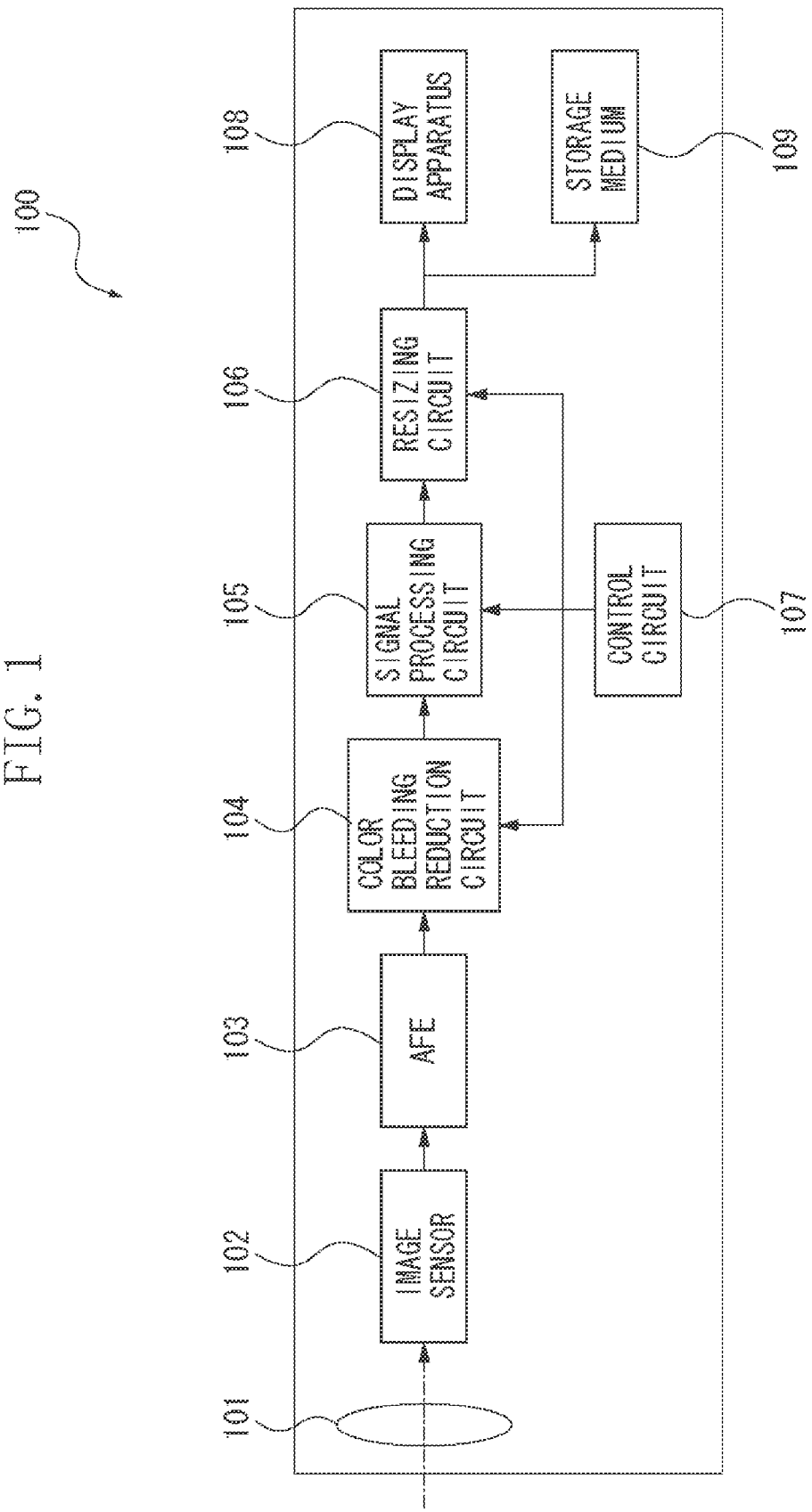
FIG. 1 is a block diagram illustrating an example of a configuration of an image processing apparatus according to a first exemplary embodiment of the present invention.

FIG. 1 is a block diagram illustrating an example of a configuration of a digital camera 100 as an image processing apparatus according to a first exemplary embodiment of the present invention.

A lens unit 101 has a zoom lens and a focus lens. An image sensor 102 is configured with a charge-coupled device (CCD) or a complementary metal-oxide semiconductor (CMOS) sensor, and receives an optical object image through the lens unit 101 and converts the object image into an electric signal. An analog front-end (AFE) circuit 103 includes a correlated double sampling (CDS) circuit and an analog/digital (A/D) converter. A color bleeding reduction circuit 104 reduces color bleeding in image data.

A signal processing circuit 105 performs various corrections on the image data output from the color bleeding reduction circuit 104. A resizing circuit 106 performs a variable power processing to change the size of the image data output from the signal processing circuit 105. A control circuit 107 controls the operation of the entire camera in addition to the color bleeding reduction circuit 104, the signal processing circuit 105, and the resizing circuit 106.

A display apparatus 108 includes a liquid crystal panel or an organic EL panel, and displays to a user an image formed based on the image data whose magnification is varied by the resizing circuit 106. A storage medium 109 stores the image data whose magnification is varied by the resizing circuit 106.

The object image reflected by the object is transmitted through the lens unit 101 and formed on the image sensor 102. The image sensor 102 photo-electrically converts the object image into an electric signal and outputs the electric signal as analog image data. The analog image data is converted into digital image data by the AFE circuit 103.

As described in further detail below, the digital image data is subjected to a color bleeding reduction by the color bleeding reduction circuit 104 performing an image processing for reducing the color saturation of an area where the color bleeding is presumed to be caused in the image data. The image data subjected to the color bleeding reduction is subjected to luminance correction, white balance correction, and edge enhancement in the signal processing circuit 105.

The image data output from the signal processing circuit 105 is subjected to an expansion processing or a reduction processing in the resizing circuit 106, and output as output image data. The resizing circuit 106 previously receives magnification data Z from the control circuit 107 and performs magnification processing on the image data according to the value indicated by the magnification data Z.

Figure 2:
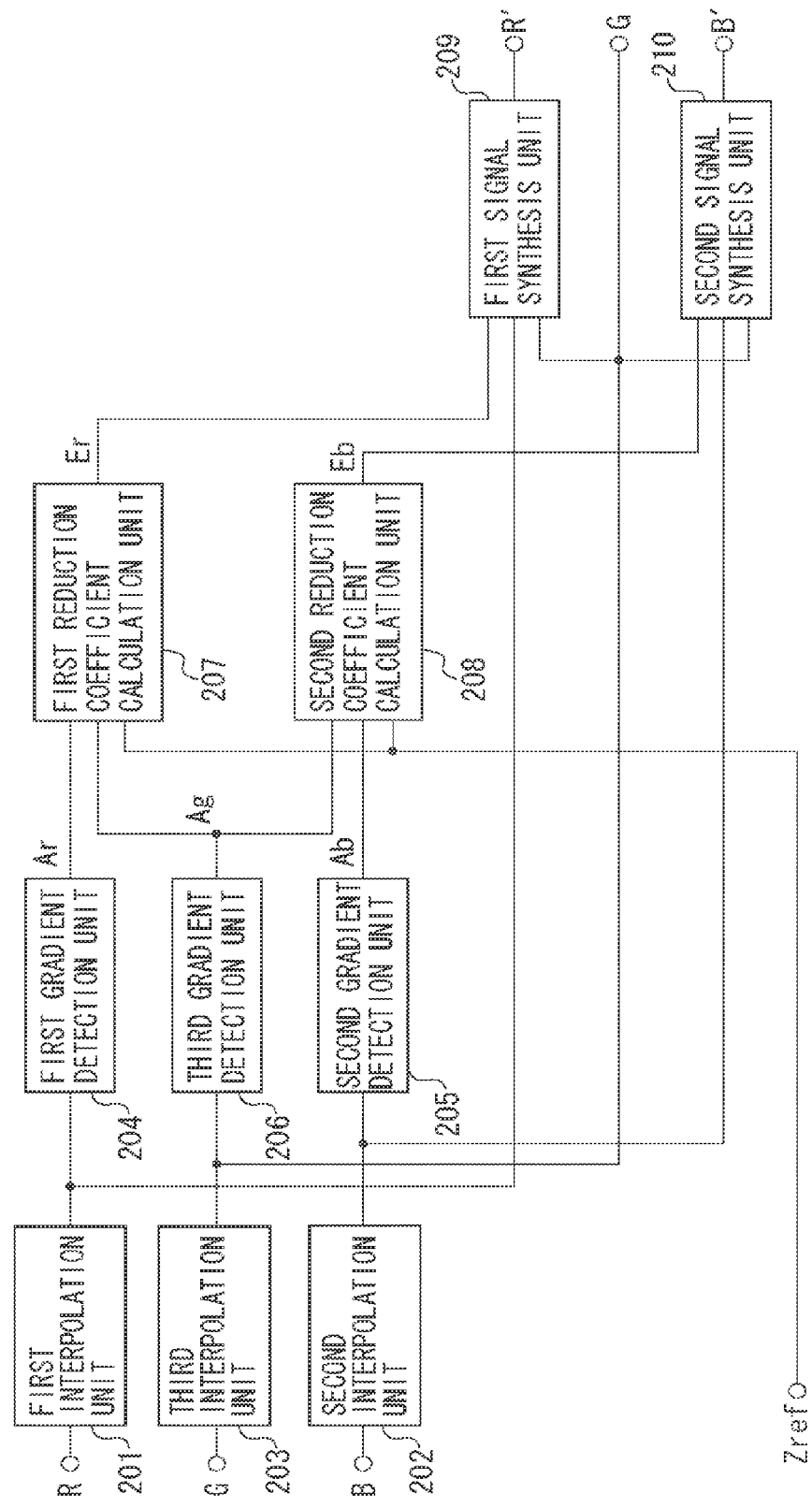
FIG. 2 is a block diagram illustrating an example of a configuration of a color bleeding reduction circuit according to the first exemplary embodiment of the present invention.

FIG. 2 is a block diagram of an example of a configuration of the color bleeding reduction circuit 104 illustrated in FIG. 1.

The image data output from the AFE circuit 103 is separated into three primary colors R, B, and G. A first interpolation unit 201, a second interpolation unit 202 and a third interpolation unit 203 subject the R, B, and G to an interpolation process to provide all pixel positions with respective values of R, B, and G. The R indicates a red component video signal, the G indicates a green component video signal, and the B indicates a blue component video signal.

In the color bleeding reduction, a video signal having wideband color components such as a luminance signal is taken as a reference signal, and a video signal with the other color components is taken as a signal to be reduced. In the present exemplary embodiment, the reference signal with a color component near a luminance signal is taken as G and the signals to be reduced are taken as R and B.

The video signals R, B, and G are input to a first gradient detection unit 204, a second gradient detection unit 205, and a third gradient detection unit 206, which are evaluation value calculation units respectively. The first to third gradient detection units 204, 205, and 206 output corresponding gradient signals Ar, Ab, and Ag. The gradient signals Ar and Ab of the reduction-target signals R and B are gradient signals to be reduced. The gradient signal Ag of the reference signal G is a reference gradient signal. The gradient signals Ar, Ab, and Ag are used as the evaluation value of the color bleeding. The first and the second gradient detection units 204 and 205 correspond to gradient-to-be-reduced detection units and the third gradient detection unit 206 corresponds to a reference gradient detecting unit.

The gradient signals Ar and Ag are input to a first reduction coefficient calculation unit 207. The gradient signals Ab and Ag are input to a second reduction coefficient calculation unit 208. The first reduction coefficient calculation unit 207 outputs a color bleeding reduction coefficient Er of the reduction-target signal R based on the result in which the gradient signal Ar is compared with the gradient signal Ag and a reference magnification data Zref output from the control circuit 107.

The second reduction coefficient calculation unit 208 outputs a color bleeding reduction coefficient Eb of the reduction-target signal B based on the result in which the gradient signal Ab is compared with the gradient signal Ag and a reference magnification data Zref output from the control circuit 107.

A first signal synthesis unit 209 receives the color bleeding reduction coefficient Er, the reference signal G, and the reduction-target signal R. The first signal synthesis unit 209 reduces the color bleeding by a weighted combination of the reference signal G and the reduction-target signal R according to the color bleeding reduction coefficient Er, and outputs a signal R' obtained by performing the color bleeding reduction on the reduction-target signal R.

A second signal synthesis unit 210 receives the color bleeding reduction coefficient Eb, the reference signal G, and reduction-target signal B. The second signal synthesis unit 210 reduces the color bleeding by a weighted combination of the reference signal G and the reduction-target signal B according to the color bleeding reduction coefficient Eb and outputs a reduction-target signal B' obtained by performing the color bleeding reduction on the reduction-target signal B. The reference signal G is output as it is without being subjected to the color bleeding reduction in the first and the second signal synthesis unit 209 and 210.

Figure 3:
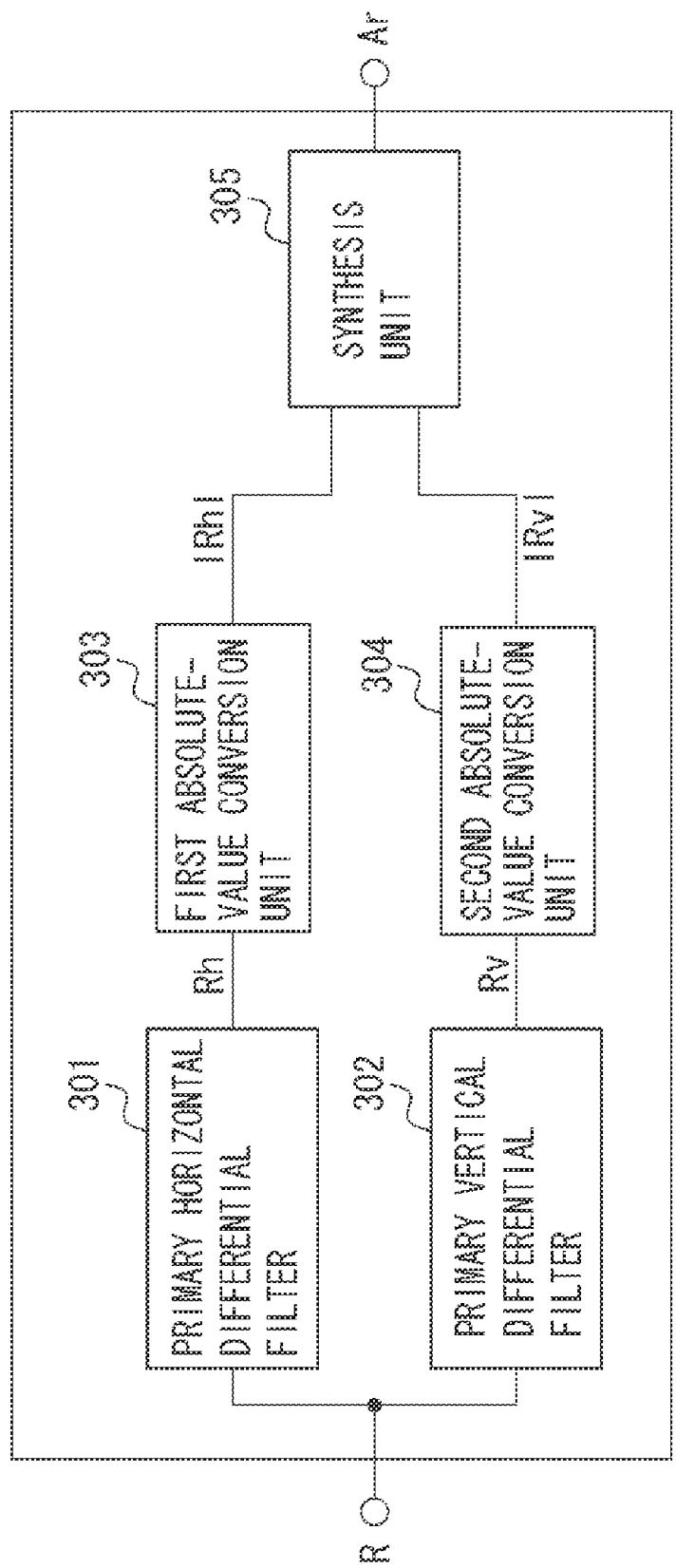
FIG. 3 is a block diagram illustrating an example of a configuration of a first gradient detection unit of the color bleeding reduction circuit according to the first exemplary embodiment of the present invention.

The components illustrated in FIG. 2 are described in detail below. FIG. 3 is a block diagram illustrating an example of a configuration of the first gradient detection unit 204. Since the first to the third gradient detection units 204 to 206 include common components, "R" and "r" in the following description may be replaced with "B" and "b" and "G" and "g" in the second and the third gradient detection units 205 and 206 respectively.

An input signal R is input to a primary horizontal differential filter 301 and a primary vertical differential filter 302, which are a spatial filter.

Figure 4A:
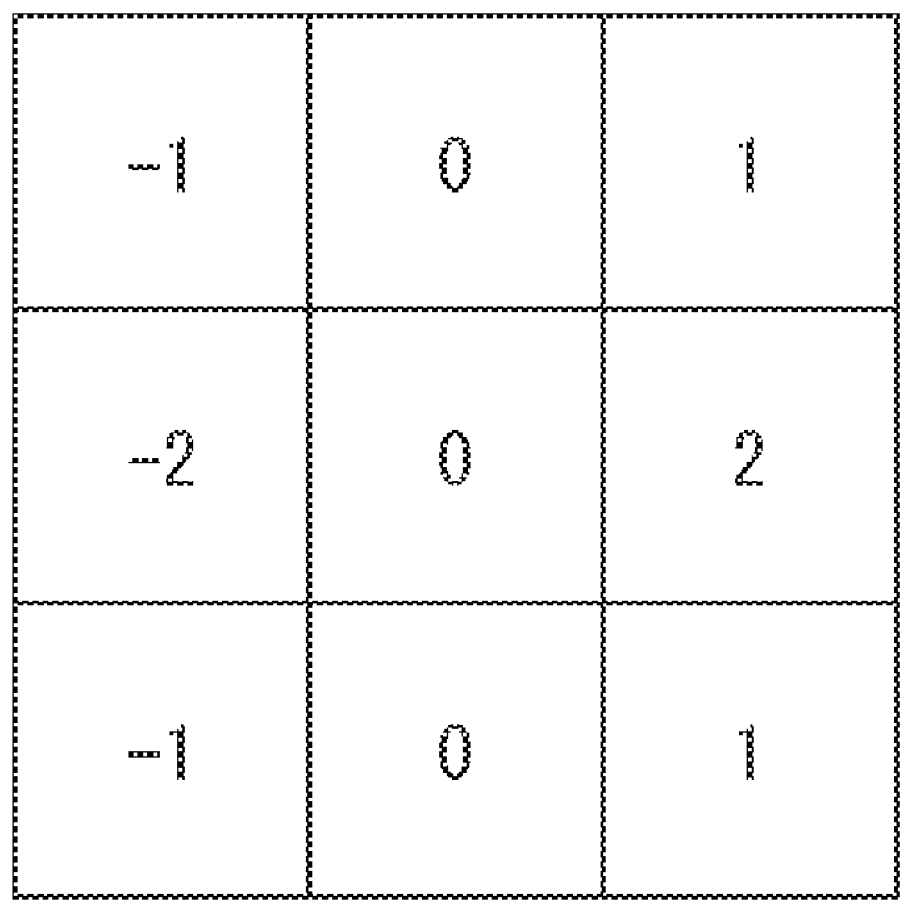

The primary horizontal differential filter 301 is, for example, a Sobel filter of 3×3 pixels with a filter coefficient illustrated in FIG. 4A, and detects a horizontal primary differential value, i.e., a horizontal gradient Rh, of a pixel included in a square area centering about a pixel of interest.

Figure 4B:
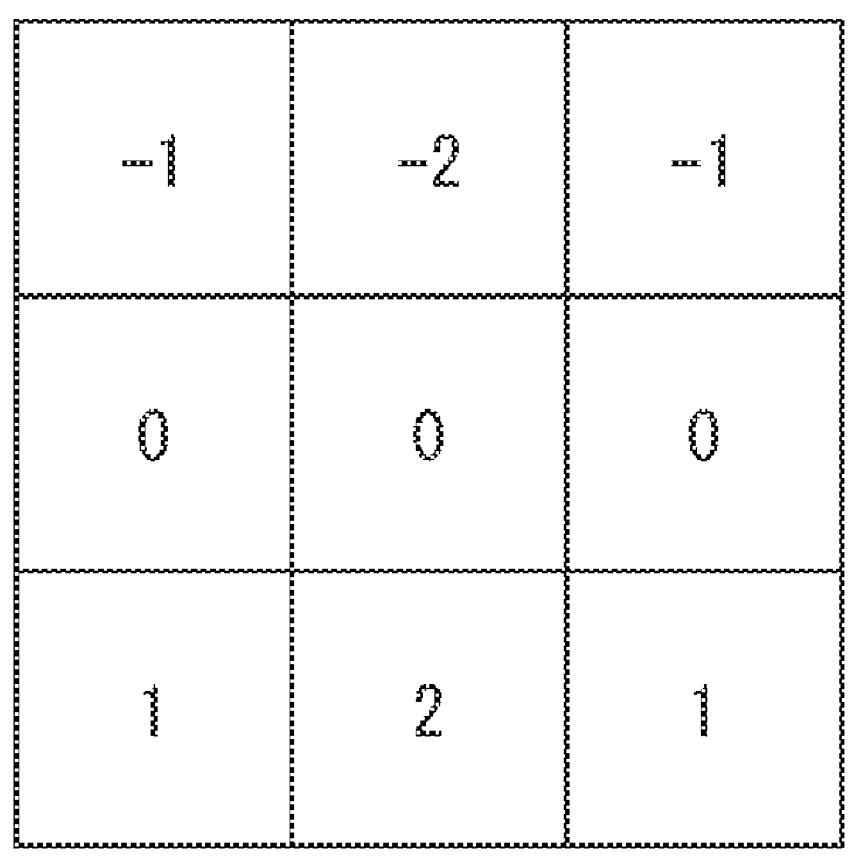

The primary vertical differential filter 302 is, for example, a Sobel filter of 3×3 pixels with a filter coefficient illustrated in FIG. 4B, and detects a vertical primary differential value, i.e., a vertical gradient Rv, of a pixel included in a square area centering about a pixel of interest.

The output horizontal and vertical gradients Rh and Rv are converted into absolute values |Rh| and |Rv| by a first and a second absolute-value conversion unit 303 and 304 respectively, and input to a synthesis unit 305.

The synthesis unit 305 synthesizes horizontal and vertical gradients |Rh| and |Rv| using the following equation:

$$Ar=|Rh|+|Rv| \tag{1}$$

and outputs a gradient signal Ar.

Equation 1 and FIG. 3 represent a simplified synthesis calculation to reduce the calculation load of hardware. If the resource of hardware is sufficient, it is desirable to determine a gradient by calculating the square root of sum of squares of the horizontal and the vertical gradient Rh and Rv using the following equation:

$$Ar=\sqrt{(Rh^2+Rv^2)} \quad (2).$$

The operation of the first and the second reduction coefficient calculation units 207 and 208 is described below.

The operation and configuration of the first and the second reduction coefficient calculation unit 207 and 208 are common to each other. Only signals to be processed are different. For this reason, only the first reduction coefficient calculation unit 207 is described below, however, "R" and "r" in the following description may be replaced with "B" and "b" for the second gradient detection unit 208 respectively.

The first reduction coefficient calculation unit 207 receives the gradient Ag of the reference signal G and the gradient Ar of the reduction-target signal R. A threshold g_th for the gradient Ag and a threshold r_th for the gradient Ar are set. The thresholds may be input from an external circuit (not illustrated).

Figure 5:
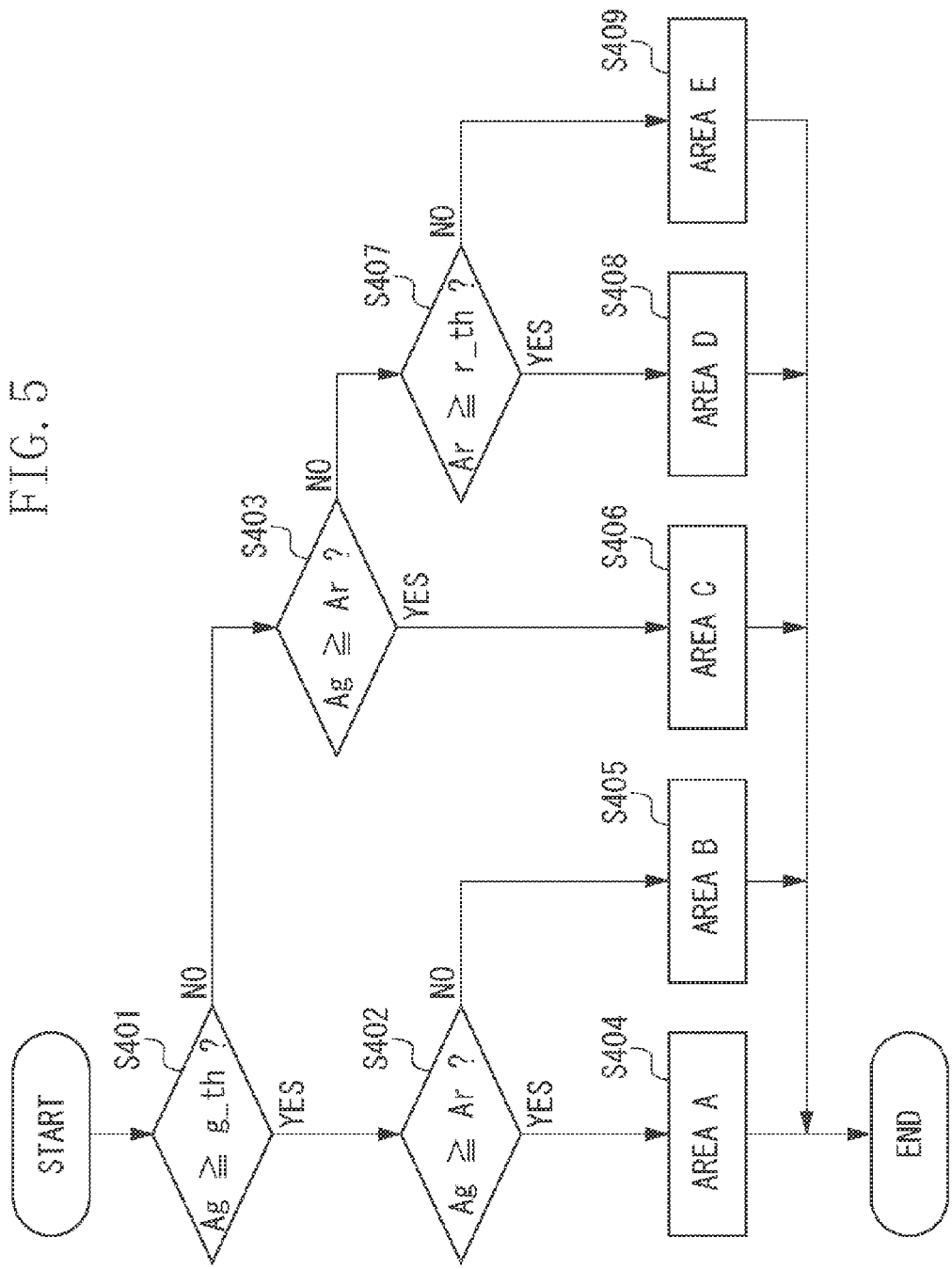
FIG. 5 is a flow chart for determining a gradient attribute in a first reduction coefficient calculation unit according to the first exemplary embodiment of the present invention.

The first reduction coefficient calculation unit 207 determines a gradient attribute of position of a pixel of interest to calculate a reduction coefficient. How the first reduction coefficient calculation unit 207 determines a gradient attribute is described below with reference to a flow chart of FIG. 5.

In step S401, the first reduction coefficient calculation unit 207 compares the gradient Ag of the reference signal G with the threshold g_th. If Ag≧g_th (YES in step S401), the processing proceeds to step S402. If Ag<g_th (NO in step S401), the processing proceeds to step S403.

In step S402, the first reduction coefficient calculation unit 207 compares the gradient Ag of the reference signal G with the gradient Ar of the reduction-target signal R. If Ag≧Ar (YES in step S402), the processing proceeds to step S404. If Ag<Ar (NO in step S402), the processing proceeds to step S405.

In step S403, the first reduction coefficient calculation unit 207 compares the gradient Ag of the reference signal G with the gradient Ar of the reduction-target signal R. If Ag≧Ar (YES in step S403), the processing proceeds to step S406. If Ag<Ar (NO in step S403), the processing proceeds to step S407.

In step S407, the first reduction coefficient calculation unit 207 compares the gradient Ar of the reduction-target signal R with the threshold r_th. If Ar≧r_th (YES in step S407), the processing proceeds to step S408. If Ar<r_th (NO in step S407), the processing proceeds to step S409.

Figure 6:
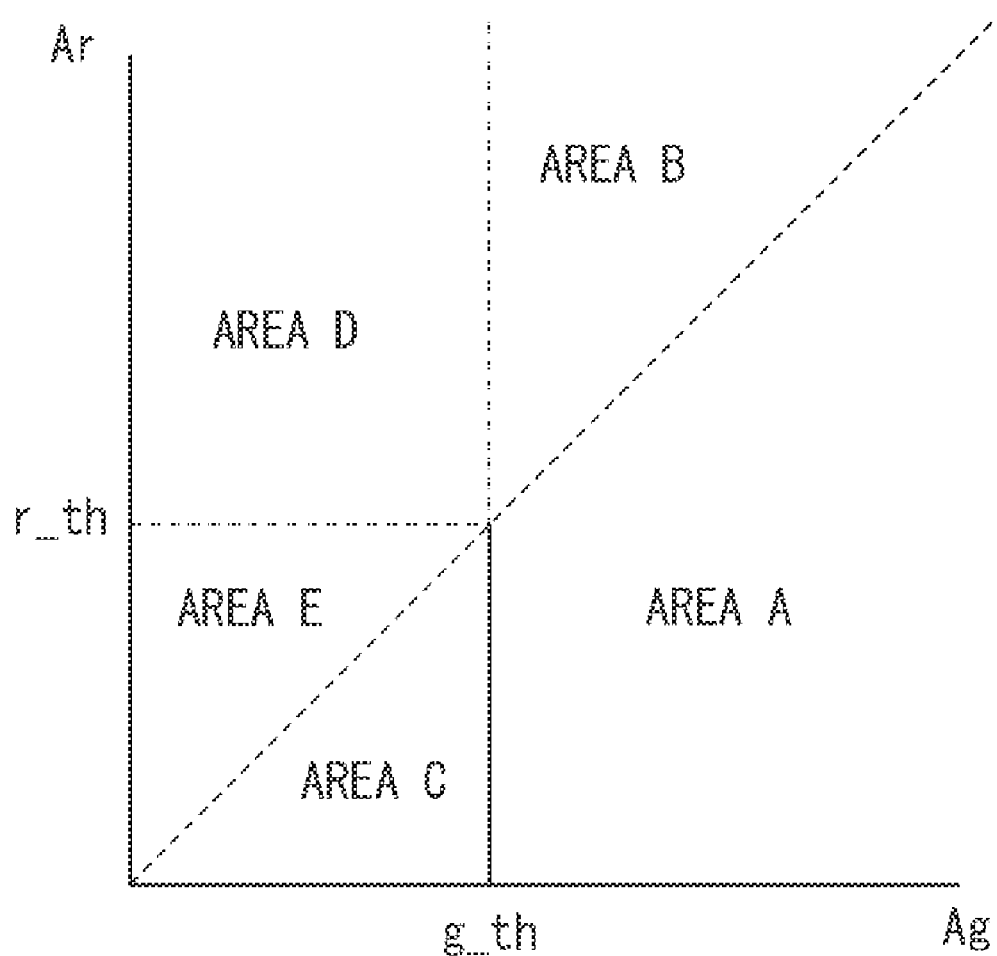
FIG. 6 illustrates an example of classified gradient attributes of a target pixel in the first reduction coefficient calculation unit according to the first exemplary embodiment of the present invention.

Such a conditional branch classifies the gradient attribute of a target pixel as illustrated in FIG. 6, for example, according to the gradients Ag and Ar, and the thresholds g_th and r_th.

If the processing proceeds to step S404, the gradient attribute is determined in an area A in FIG. 6. If the processing proceeds to step S405, the gradient attribute is determined in an area B in FIG. 6. If the processing proceeds to step S406, the gradient attribute is determined in an area C in FIG. 6. If the processing proceeds to step S408, the gradient attribute is determined in an area D in FIG. 6. If the processing proceeds to step S409, the gradient attribute is determined in an area E in FIG. 6.

It is presumed that the probability that the color bleeding is caused is increased in the area as the gradient Ag of the reference signal G is greater than the gradient Ar of the reduction-target signal R, and the gradient Ag of the reference signal G is greater. On the other hand, it is presumed that the probability that the color bleeding is caused is low in the area where the gradient Ag of the reference signal G is small and the area where the gradient Ag of the reference signal G is smaller than the gradient Ar of the reduction-target signal R to some extent.

How the first reduction coefficient calculation unit 207 determines a color bleeding reduction coefficient is described below with reference to FIGS. 7A to 7C.

In respective areas A to E classified according to the gradient attribute, the first reduction coefficient calculation unit 207 represents the color bleeding reduction coefficient Er as functions of the gradients Ag and Ar and the thresholds g_th and r_th using the following equations, for example:

[Area A]

$$Er=Ag\times\alpha \quad (3)$$

[Area B]

$$Er=\{(Ag-Ar)\times\beta+Ar\}\times\alpha \quad (4)$$

[Area C]

$$Er=\{(Ag-g\_th)\times\beta+g\_th\}\times\alpha \quad (5)$$

[Area D]

$$Er=\{(Ag-Ar)\times\beta+Ar\}\times\alpha \quad (6)$$

[Area E]

$$Er=\{(Ag-r\_th)\times\beta+r\_th\}\times\alpha \quad (7)$$

where, if Er<0, then Er=0, and α and β are any variables as described below.

Figure 7A:
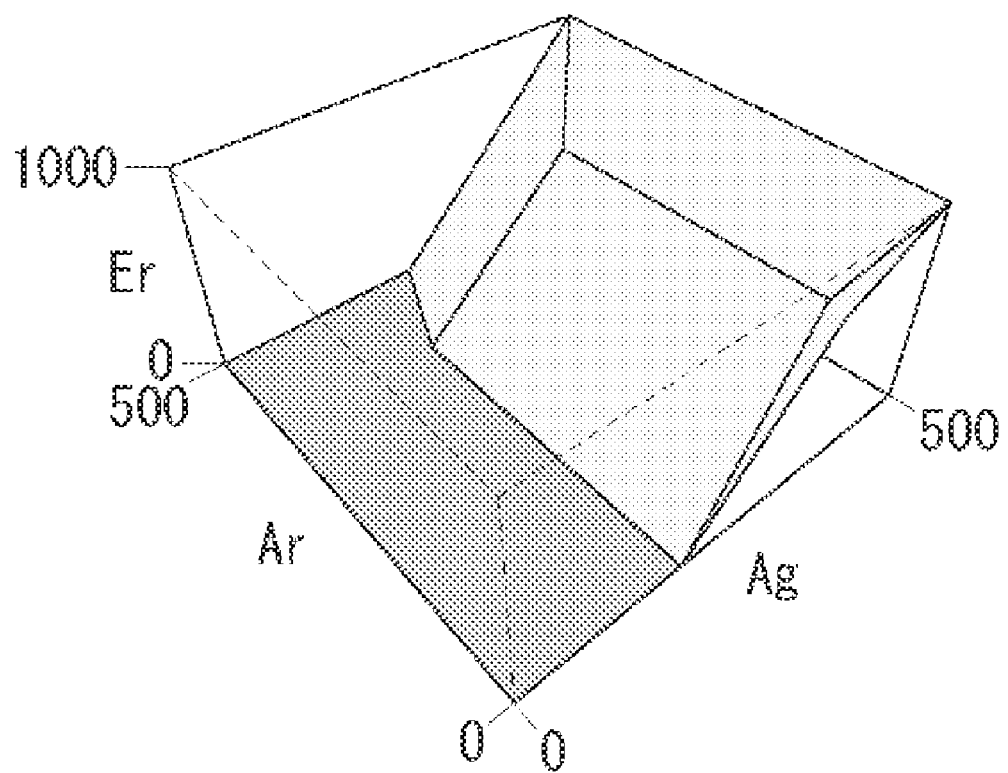
FIGS. 7A to 7C illustrate a method of determining a color bleeding reduction coefficient in the first reduction coefficient calculation unit according to the first exemplary embodiment of the present invention.
Figure 7B:
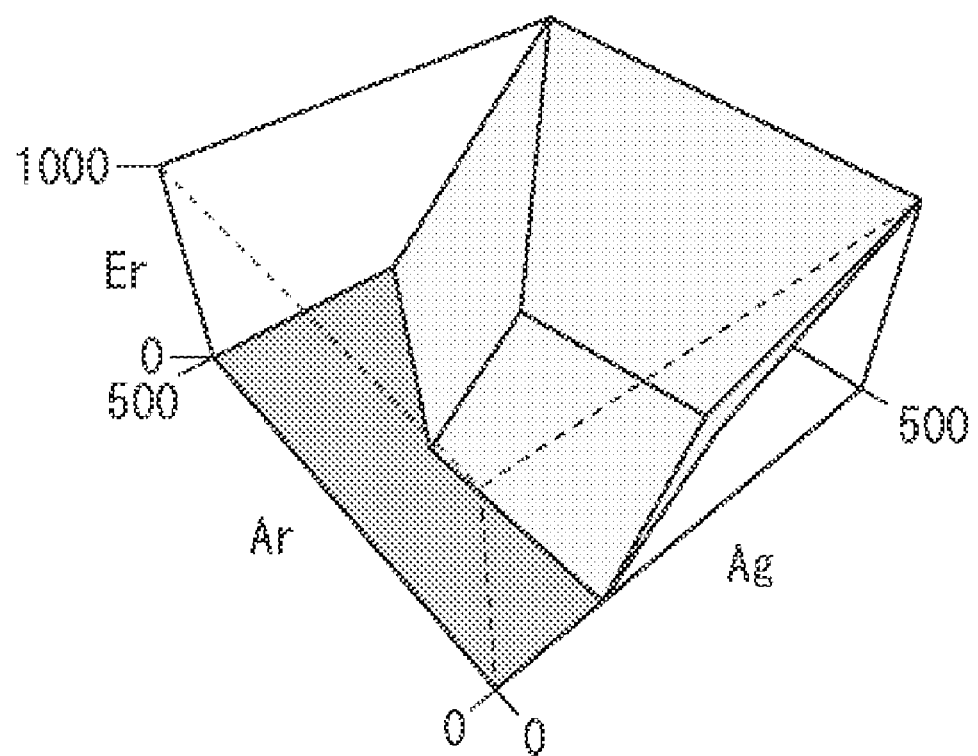
Figure 7C:
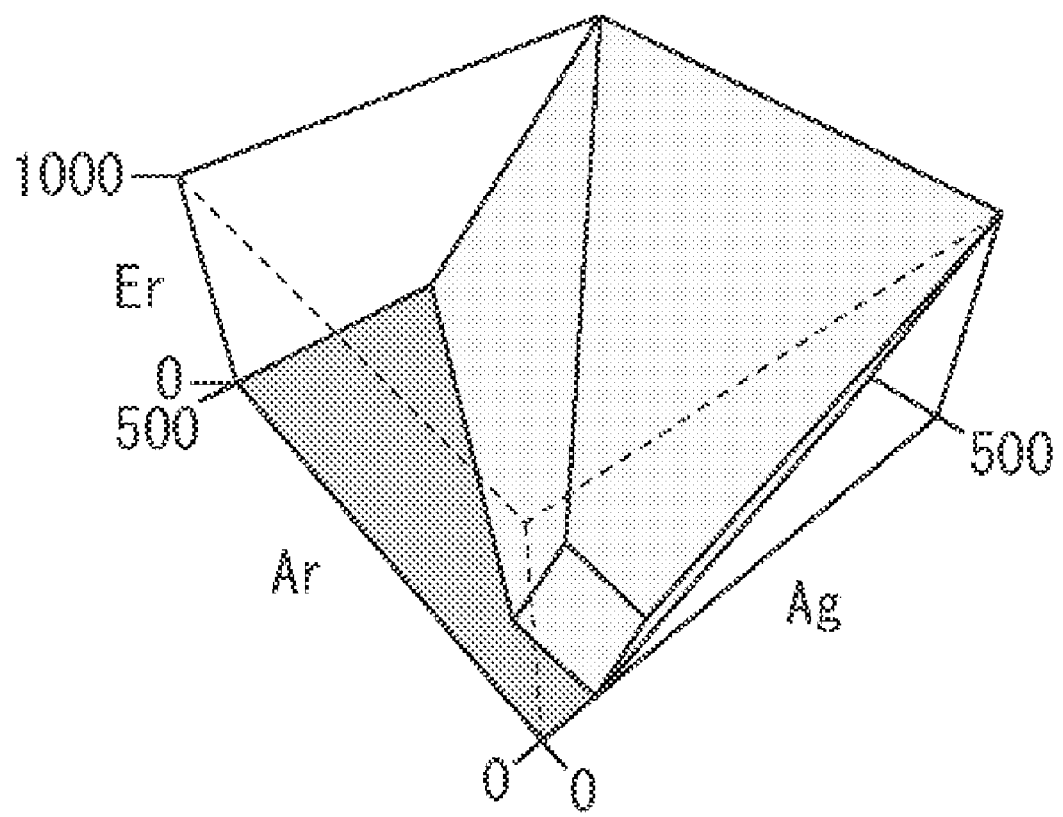

The color bleeding reduction coefficient Er represented by the above equations has a three-dimensional characteristic with respect to an Ag-Ar plane, which varies with the thresholds g_th and r_th, as illustrated in FIGS. 7A to 7C. The reduction coefficient Er is set stepwise so that the extent of the color bleeding reduction increases (the value increases) at the position of a pixel as the probability that the color bleeding is caused is higher, and the extent of the color bleeding reduction decreases (the value decreases) at the position of a pixel as the probability that the color bleeding is caused is lower.

The increase of the thresholds g_th and r_th in the characteristic of FIG. 7B increases the area of Er=0 in the directions of the axes Ag and Ar as illustrated in FIG. 7A. In other words, the color bleeding reduction effect in an area where the gradients Ag and Ar are low is made lower than that in the characteristic of FIG. 7B, which allows suppressing malfunction at a color edge, for example.

On the other hand, the decrease of the thresholds g_th and r_th in the characteristic of FIG. 7B decreases the area of Er=0 in the directions of the Ag and Ar axes as illustrated in FIG. 7C. In other words, the color bleeding can be more easily reduced even in an area where the gradients Ag and Ar are lower than that in the characteristic of FIG. 7B, which allows easier color bleeding reduction to be performed on a low gradient portion.

In the equations 3 to 7, α and β are variables for adjusting the intensity of a color bleeding reduction. The output gain of the reduction coefficient Er can be adjusted by α. The greater the value of β, the steeper the rising of characteristics (i.e., the angle of slope of the trapezoid body) illustrated in FIGS. 7A to 7C, so that the increase ratio of the color bleeding reduction coefficient to the gradients Ag and Ar can be controlled. Aside from the value of the threshold, the size of an area where the reduction is not performed (i.e., an area of Er=0) can be controlled.

Thus, the values of the thresholds g_th and r_th, and the variables α and β are adjusted to enable the color bleeding to be reduced from a low to high gradient which avoids malfunction for a color edge.

In the present exemplary embodiment, the magnification data Z output from the control circuit 107 previously is input not only to the resizing circuit 106, but also to the first and the second reduction coefficient calculation units 207 and 208. The first and the second reduction coefficient calculation units 207 and 208 change the thresholds g_th and r_th, and the thresholds g_th and b th according to the magnification data Z received from the control circuit 107 respectively.

If the value indicating an electronic zoom magnification is taken as MAG (0<MAG≦256), the magnification data Z can be acquired from the MAG using the following equation, for example:

$$Z=256-(256/MAG) \tag{8}$$

The reference value MAGref of an electronic zoom magnification is determined from the size of image data input to the resizing circuit 106 and the size of output image data determined according to the instructions from a user or the screen size of the display apparatus. The value acquired as Z when the MAGref is substituted for MAG in the equation 8 is taken as the reference magnification data Zref, and the control circuit 107 stores the reference magnification data Zref.

The reference magnification data Zref indicates the size of the analog image data determined by the image data reading method of the image sensor 102 and the size of previously set output image data.

If the size of output image data is greater than the size of image data input to the resizing circuit 106, the value of the MAGref is not less than 1.0, so that the reference magnification data Zref becomes a positive value from the equation 8.

On the other hand, if the size of output image data is smaller than the size of image data input to the resizing circuit 106, the value of the MAGref is less than 1.0, so that the reference magnification data Zref becomes a negative value from the equation 8.

When an image subjected to a color bleeding reduction processing is subjected to an expansion process, both of the area where the color bleeding is reduced due to erroneous determination but the color bleeding is not caused, and the area where the color bleeding is not reduced but the color bleeding is caused, are expanded. As described above, the area where the color bleeding is erroneously reduced is probably more conspicuous by its unnaturalness than the area where the color bleeding remains.

Therefore, the thresholds g_th and r_th are set so that the greater the magnification data Z, the wider the range of the gradient signals Ar and Ag where Er=0 as an evaluation value as illustrated in FIG. 7A. This reduces the possibility that the area where the color bleeding is not caused is subjected to the color bleeding reduction. In order that the area where the probability that the color bleeding is caused is high is subjected to a sufficient color-bleeding reduction, the variables α and β are set to increase the increasing rate of the color bleeding reduction coefficient.

The thresholds g_th and r_th are set so that the smaller the magnification data Z, the narrower the range of the gradient signals Ar and Ag where Er=0 as an evaluation value as illustrated in FIG. 7C. Thus, the smaller the magnification data Z, the wider the color bleeding reduction-target area.

Alternatively, the smaller the magnification data Z, the wider the area where the extent of reduction of the color bleeding is increased. As a result, this may increase the area where the color bleeding is not caused but the color bleeding reduction is performed, however, a small magnification of image data does not make the area conspicuous.

Furthermore, the color bleeding area subjected to the reduction process is greater than the area erroneously subjected to the reduction process, which leads to improvement in picture quality of the entire image data. The variables α and β are set so that the increasing rate of the color bleeding reduction coefficient is decreased, thus subjecting the area where the probability that the color bleeding is caused seems not to be high to a moderate color bleeding reduction.

Figure 8:
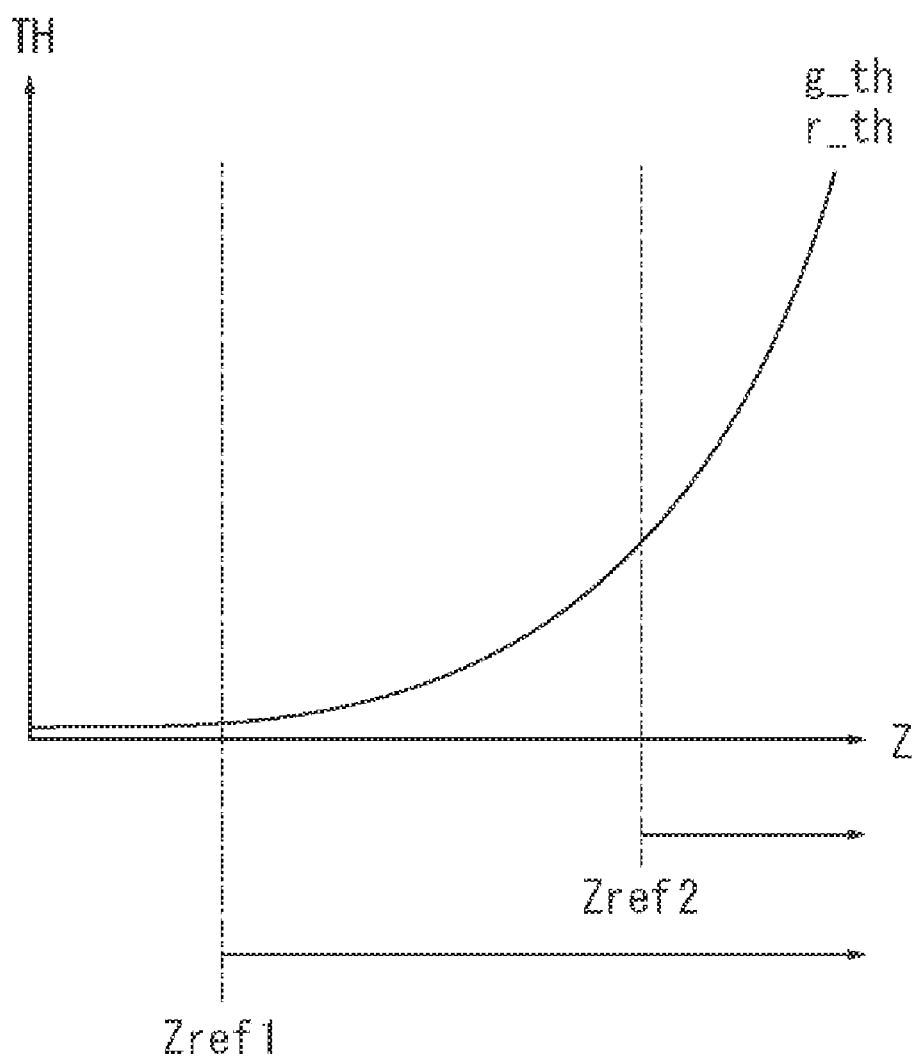
FIG. 8 is a graph illustrating a method of determining a threshold for a magnification data in the first reduction coefficient calculation unit according to the first exemplary embodiment of the present invention.

FIG. 8 illustrates a characteristic in which the thresholds g_th and r_th increase as a function of the magnification data Z. It is assumed that a reference magnification data Zref1 is smaller in value than a reference magnification data Zref2.

As described above, the reference magnification data Zref1 and Zref2 are determined from the ratio of the size of image data input to the resizing circuit 106 to the size of output image data according to the screen size of the display apparatus. The magnification data Z can be changed to a value greater than the reference magnification data Zref by a user performing an operation for making the size of output image data greater than the screen size of the display apparatus.

As illustrated in FIG. 8, when the reference magnification data Zref is small, even if output image data is increased to some extent and an area erroneously subjected to the color bleeding reduction is caused, the area is not conspicuous. For this reason, the thresholds g_th and r_th are not increased too much while the area erroneously subjected to the color bleeding reduction is inconspicuous. The thresholds g_th and r_th are markedly increased after the area erroneously subjected to the color bleeding reduction becomes conspicuous.

On the other hand, when the reference magnification data Zref is great, if an area erroneously subjected to the color bleeding reduction is caused, the area is already conspicuous. For this reason, the thresholds g_th and r_th have already set to a great value and are markedly increased according to the increase of the magnification data Z.

Figure 9:
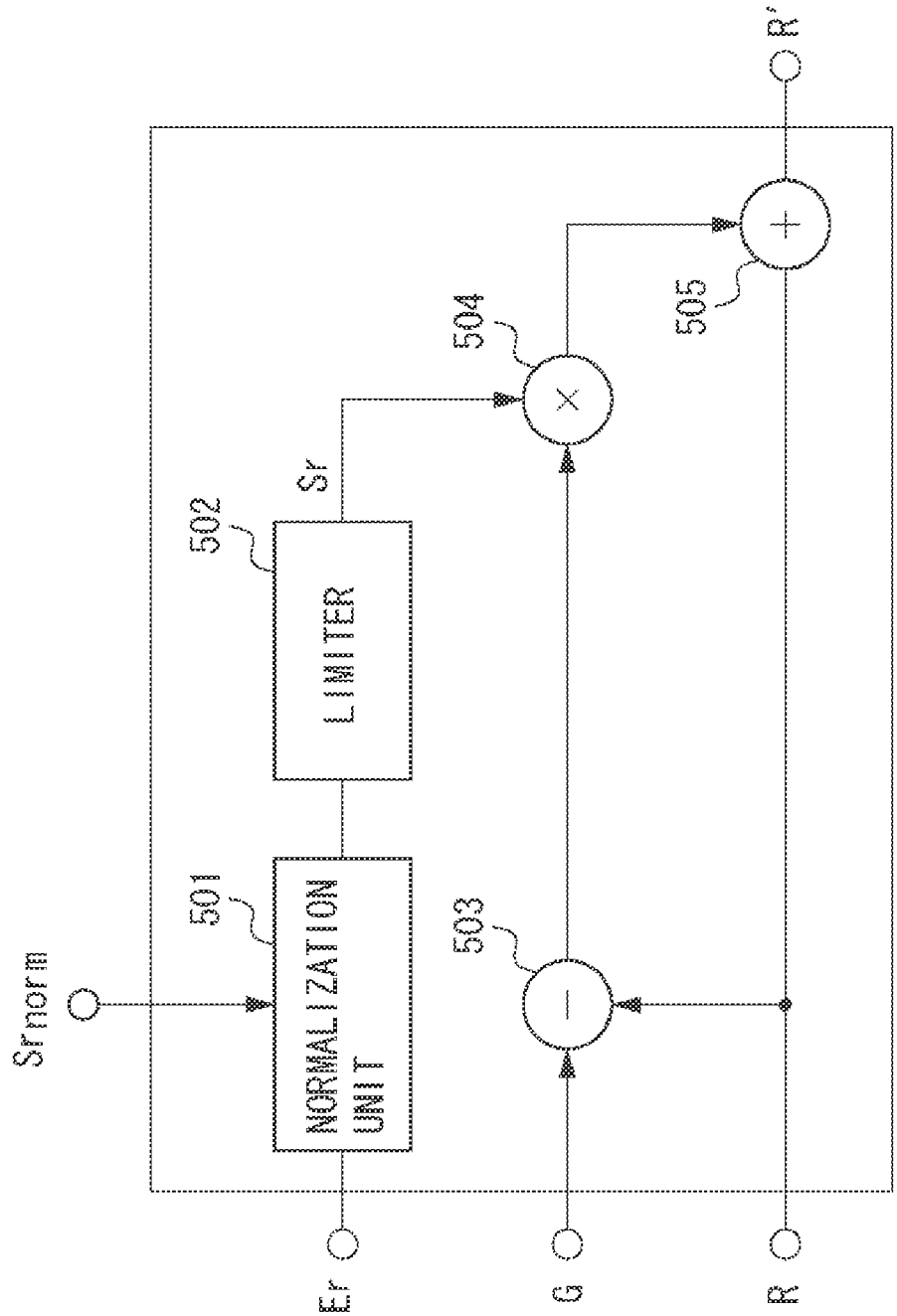
FIG. 9 is a block diagram illustrating an example of a configuration of a first and a second signal synthesis unit according to the first exemplary embodiment of the present invention.

FIG. 9 is a block diagram illustrating an example of a configuration of the first and the second signal synthesis units 209 and 210.

The operation and configuration of the first and the second signal synthesis units 209 and 210 are common to each other. Only signals to be processed are different. For this reason, only the first signal synthesis unit 209 is described below, however, "R" and "r" in the following description may be replaced with "B" and "b" for the second signal synthesis unit 210 respectively.

The color bleeding reduction coefficient Er output by the first reduction coefficient calculation unit 207 is normalized by a predetermined normalization level Srnorm (or input from the outside) in a normalization unit 501. The normalized color bleeding reduction coefficient Er is limited by a limiter 502 so that the value does not exceed 1.0 to be a synthesis coefficient Sr.

A subtracter 503 subtracts the reduction-target signal R from the reference signal G. A multiplier 504 multiplies a subtraction result (G−R) by the synthesis coefficient Sr. An adder 505 adds the reduction-target signal R to (G−R)×Sr, and outputs the signal R' obtained by performing the color bleeding reduction on the reduction-target signal R."

The calculation processing of the first signal synthesis unit 209 can be represented by the following equation:

$$R'=Sr\times(G-R)+R \tag{9}$$

where, Sr=Er/Srnorm, if Sr>1.0, then Sr=1.0.

The synthesis coefficient Sr is mixed with the reference signal G at a rate in which the higher the synthesis coefficient Sr, the higher the reference signal G, to lower the color saturation of the reduction-target signal R, which can resultantly provide an effect in which the reduction-target signal R in an image of interest position approaches to the reference signal G.

The second signal synthesis unit 210 subjects the reduction-target signal B to the similar processing, mixes synthesis coefficient Sb with the reference signal G at a rate in which the higher the synthesis coefficient Sb, the higher the reference signal G, to lower the color saturation of the reduction-target signal B, which can resultantly provide an effect in which the reduction-target signal B in an image of interest position approaches to the reference signal G.

According to the present exemplary embodiment, the gradient attribute of each pixel of interest is divided into a plurality of areas according to a relation between gradients of the reference signal and the reduction-target signal and the thresholds previously set to the respective gradients. A color bleeding reduction coefficient according to the area including the gradient attribute is calculated for each color signal of the pixel of interest.

This moderates a problem that failure in detecting the color bleeding caused in an area with a low gradient makes a color-bleeding correction insufficient while suppressing a problem that a color edge portion where the color bleeding is originally not caused is erroneously subjected to the color bleeding correction.

The extent of the color bleeding reduction of image data subjected to the color bleeding reduction is varied according to a magnification ratio of image data in the resizing circuit 106 at the rear stage of the color bleeding reduction circuit 104. Thus, even if an erroneous correction is caused, the color bleeding can be effectively corrected without the erroneous correction being made conspicuous.

According to the present exemplary embodiment, although G is taken as the reference signal and R and B are taken as reduction-target signals, the present exemplary embodiment is not limited to that. For example, a video signal Y of the luminance component acquired from a video signal having R, G, and B color components can be taken as the reference signal, the video signal having R, G, and B color components can be taken as a reduction-target signal, and the reference signal Y may be mixed with the reduction-target signals R, G, and B.

An example is given above where the magnification data Z is continuously increased to continuously increase the thresholds g_th and r_th, however, the present exemplary embodiment is not limited to the above example. For example, the magnification data Z may be changed from a first value to a second value greater than the first value to increase the thresholds g_th and r_th.

For example, if the magnification data Z is smaller than a reference value, a first threshold g_th and r_th may be set and if the magnification data Z is not smaller than the reference value, a second threshold g_th and r_th greater than the first threshold g_th and r_th may be set.

A second exemplary embodiment of the present invention is described below. The present exemplary embodiment is different in the configuration of the color bleeding reduction circuit 104 in FIG. 1 from the first exemplary embodiment, so that only the different portion is described.

FIG. 10 is a block diagram illustrating another configuration of the color bleeding reduction circuit 104 illustrated in FIG. 1. The interpolation units 201 to 203 are removed from FIG. 2, and low pass filters (LPF) 601 to 606 and a band control unit 607 are provided instead.

As is the case with the interpolation units 201 to 203, the LPFs 601 to 606 perform the interpolation processing to provide all pixel positions with respective values of R, B, and G. For the LPFs 601 to 603 whose outputs are input to the first to the third gradient detection unit 204, 205, and 206, bands are limited by the band control unit 607.

The band control unit 607 changes the band of the LPFs 601 to 603 according to the value of the magnification data Z. More specifically, the greater the value of the magnification data Z, i.e., the greater the magnification rate of image data, the narrower the band is made to a low frequency side. The smaller the value of the magnification data Z, i.e., the smaller the magnification rate of image data, the wider the band is made to a high frequency side.

This means that the greater the magnification rate of image data, i.e., the greater the value of the magnification data Z in the output image data, the narrower the band of the LPFs 601 to 603 is made to a low frequency side which blunts the edge portion of image data. This reduces the possibility that the color bleeding area is erroneously determined by the influence of noise on gradient.

Figure 11A:
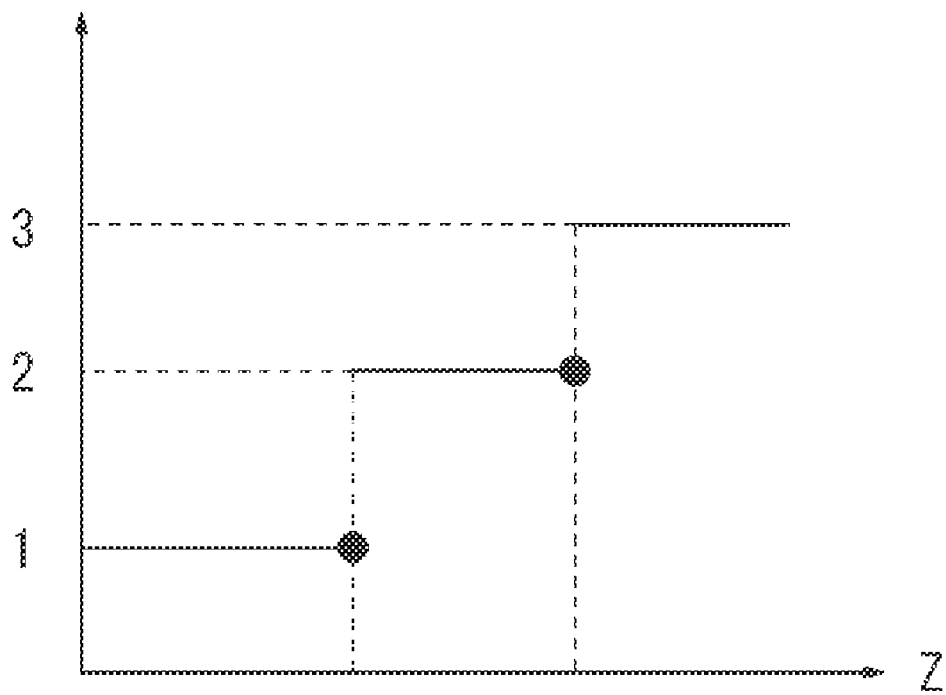
FIGS. 11A and 11B are graphs illustrating a method of setting a frequency characteristic of an LPF for magnification data in the first reduction coefficient calculation unit according to the second exemplary embodiment of the present invention.
Figure 11B:
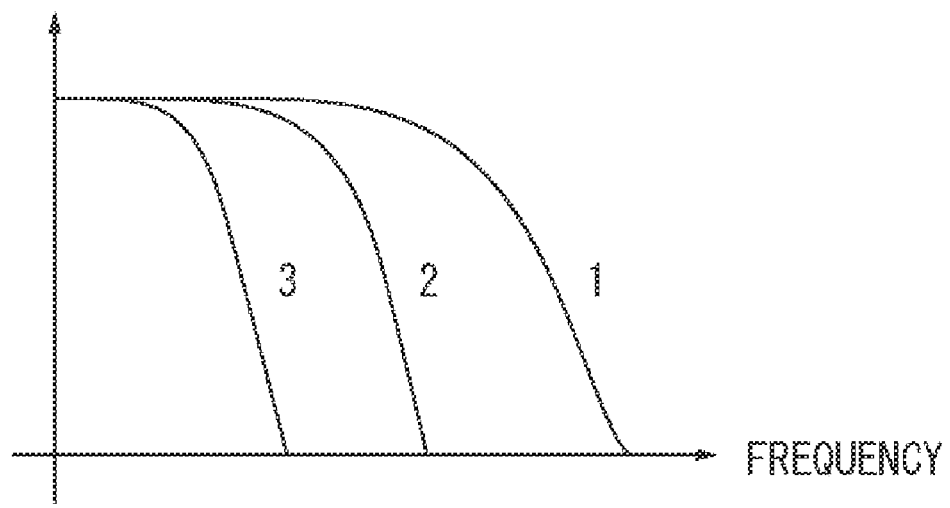

In the present exemplary embodiment, the band control unit 607 sets three different kinds of bands to the LPFs 601 to 603 according to the magnification data Z. FIG. 11A illustrates band numbers that the band control unit 607 selects according to the magnification data Z. FIG. 11B illustrates the frequency characteristics of respective band numbers.

The frequency characteristics of the LPFs illustrated in FIGS. 11A and 11B are examples and the number of the band numbers to be selected may be greater than that. The band control unit 607 may calculate frequency characteristics according to the magnification data Z instead of selecting the previously prepared band numbers.

In addition to the configuration of the first exemplary embodiment, the present exemplary embodiment has a configuration in which the greater the value of the magnification data Z, the narrower the band of the LPF is made to a low frequency side in applying the LPF to the image data input to the gradient detection unit. Thus, the more the image data is expanded, the lower the possibility that the color bleeding area is erroneously determined by the influence of noise on gradient, allowing suppressing the expansion of the area where the color bleeding is erroneously reduced.

A third exemplary embodiment of the present invention is described below. The present exemplary embodiment is different in the configuration of the color bleeding reduction circuit 104 in FIG. 1 from the first exemplary embodiment, so that only the different portion is described.

As discussed in Japanese Patent Application Laid-Open No. 2003-102027, the present exemplary embodiment uses the degree of change in difference between the reduction-target signal R and the reduction-target signal B. In the present exemplary embodiment, a color bleeding reduction coefficient Erb is output according to the degree of change in difference between the reduction-target signal A and the reduction-target signal B.

Figure 12:
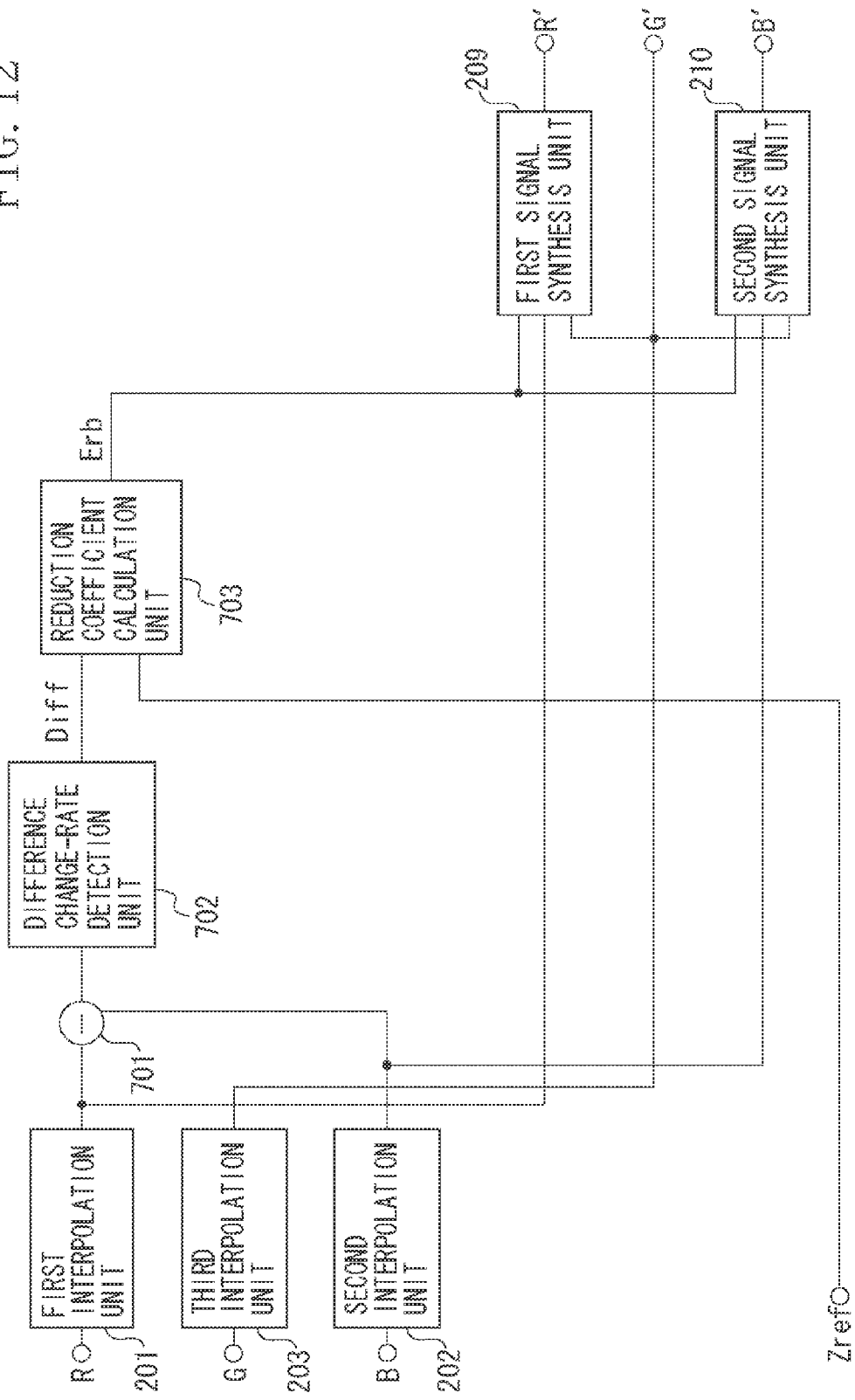
FIG. 12 is a block diagram illustrating an example of a configuration of a color bleeding reduction circuit according to a third exemplary embodiment of the present invention.

FIG. 12 is a block diagram illustrating still another configuration of the color bleeding reduction circuit 104 illustrated in FIG. 1. The gradient detection units 204 to 206, and the first and the second reduction coefficient calculation unit 207 and 208 are removed from FIG. 2 and a subtracter 701, a difference change-rate detection unit 702, and a reduction coefficient calculation unit 703 are provided instead.

The subtracter 701 acquires a difference ΔRB between the reduction-target signal R interpolated by the interpolation unit 201 and the reduction-target signal B interpolated by the interpolation unit 203 for each pixel, and outputs the difference ΔRB to the difference change-rate detection unit 702.

If a horizontal direction is taken as x and a vertical direction is taken as y and the value of the difference ΔRB between reduction-target pixels is represented by ΔRB(x, y), the difference change-rate detection unit 702 acquires a difference change-rate Diff in the pixel using the following equation 10:

$$Diff=8\times\Delta RB(x,y)-(\Delta RB(x-1,y+1)+\Delta RB(x,y+1)+\Delta RB(x+1,y+1)+\Delta RB(x-1,y)+\Delta RB(x+1,y)+\Delta RB(x-1,y-1)+\Delta RB(x,y-1)+\Delta RB(x+1,y-1)) \quad (10).$$

The reduction coefficient calculation unit 703 receives the difference change-rate Diff and calculates the color bleeding reduction coefficient Erb. In other words, the present exemplary embodiment uses the difference change-rate Diff as a color-bleeding evaluation value. The subtracter 701 and the difference change-rate detection unit 702 form an evaluation value calculation unit.

More specifically, the reduction coefficient calculation unit 703 calculates the color bleeding reduction coefficient Erb according to the following equations 11 to 13:

$$\text{If } Diff < D\_th1, Erb=0 \quad (11)$$

$$\text{If } D\_th1 <= Diff <= D\_th2, Erb=Diff/(D\_th2-D\_th1) \quad (12)$$

$$\text{If } D\_th2 < Diff, Erb=1 \quad (13).$$

Figure 13A:
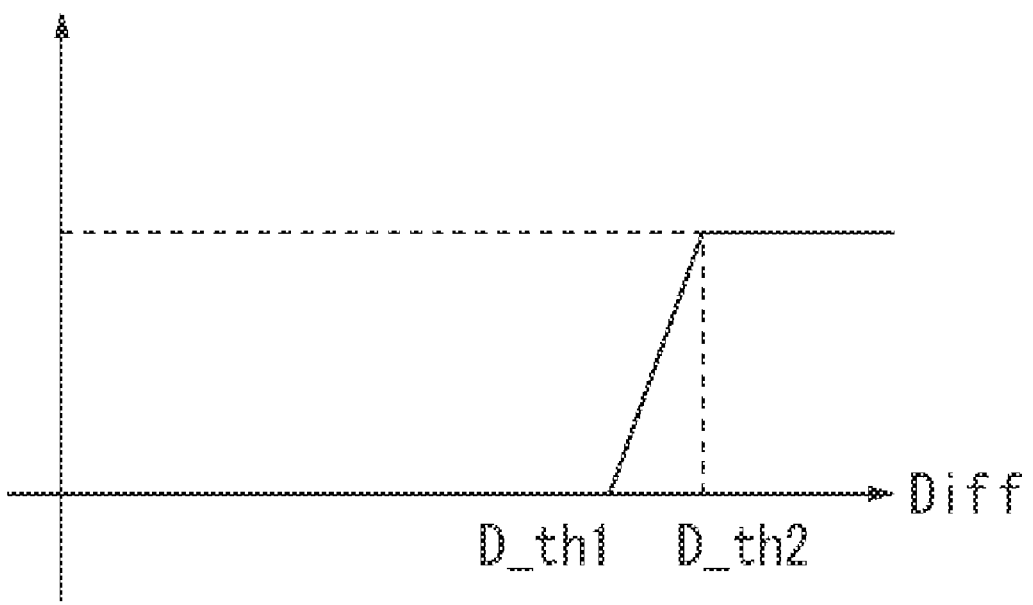
FIGS. 13A to 13C are graphs illustrating a method of determining a threshold for a magnification data in a reduction coefficient calculation unit according to the third exemplary embodiment of the present invention.
Figure 13B:
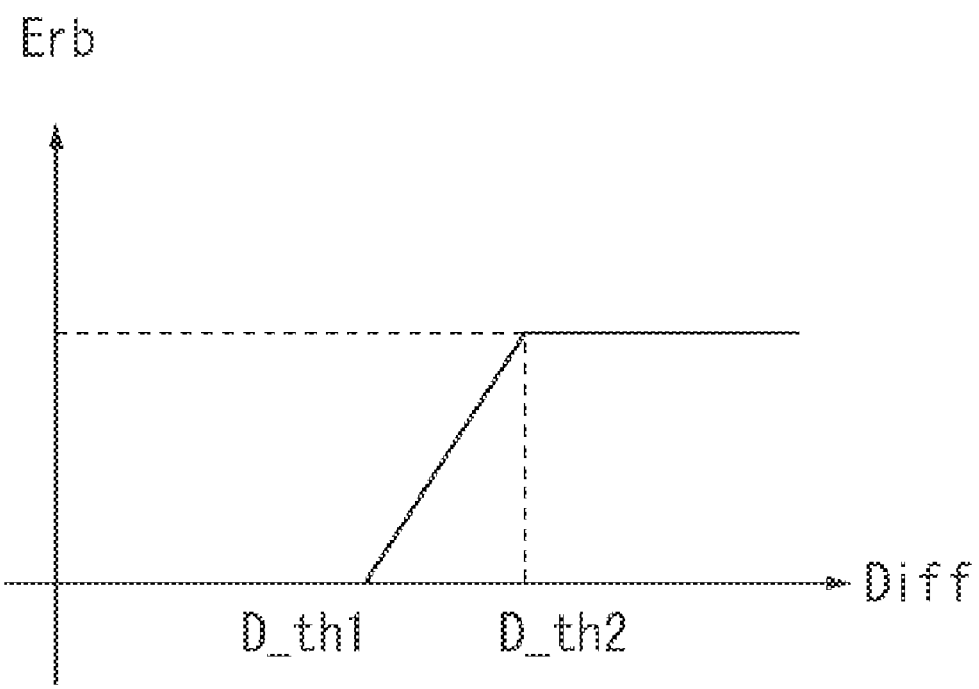
Figure 13C:
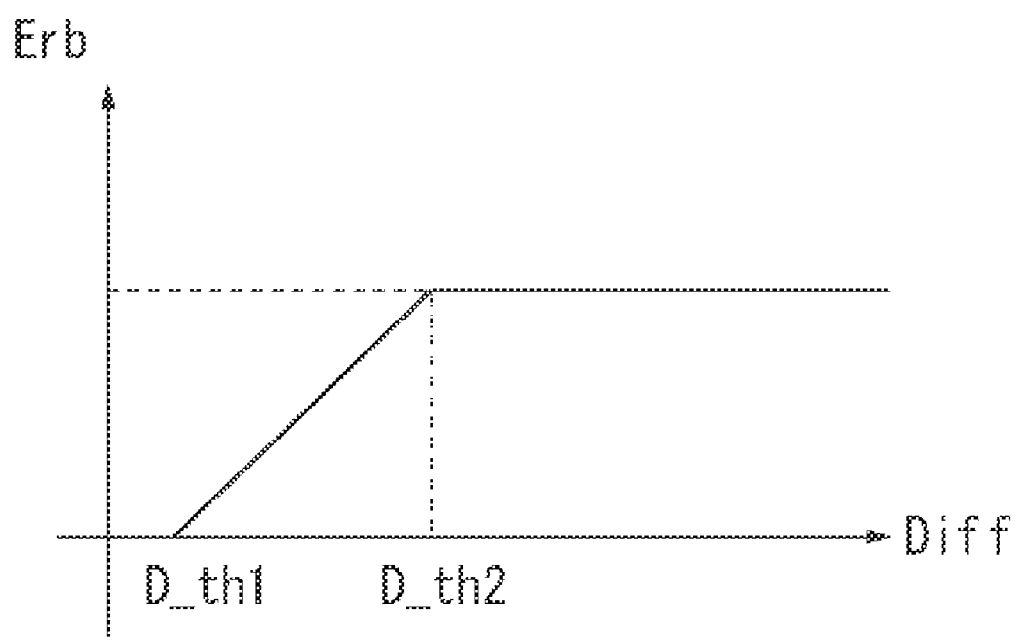

The color bleeding reduction coefficient Erb represented by the above equations changes according to the thresholds D_th1 and D_th2 as illustrated in FIGS. 13A to 13C. If the thresholds D_th1 and D_th2 are made greater than those in FIG. 13B, the range where Erb=0 is expanded as illustrated in FIG. 13A. In other words, the color bleeding reduction effect is reduced in an area where the difference change-rate of the difference ΔRB is small than the characteristic of FIG. 13B, allowing suppressing malfunction at a color edge, for example.

On the other hand, if the thresholds D_th1 and D_th2 are made smaller than those in FIG. 13B, the range where Erb=0 is decreased as illustrated in FIG. 13C. In other words, the color bleeding can be easily reduced even in an area where the difference change-rate of the difference ΔRB is smaller than the characteristic of FIG. 13B.

In the present exemplary embodiment, the thresholds D_th1 and D_th2 are set so that the greater the magnification data Z, the wider the range where Erb=0 becomes as illustrated in FIG. 13A, thus reducing the possibility that the area where the color bleeding is not caused is subjected to the color bleeding reduction.

On the other hand, the thresholds D_th1 and D_th2 are set so that the smaller the magnification data Z, the narrower the range where Erb=0 becomes as illustrated in FIG. 13C, thus increasing the area where the color bleeding is reduced. As a result, this may increase the area where the color bleeding is not caused but the color bleeding reduction is performed, however, a small magnification of image data does not make the area conspicuous.

Furthermore, the color bleeding area subjected to the reduction process is greater than the area erroneously subjected to the reduction process, which leads to improvement in picture quality of the entire image data. The difference between the thresholds D_th1 and D_th2 is set somewhat large to decrease the increasing rate of the color bleeding reduction coefficient so that the area where the probability that the color bleeding is caused seems not to be high is subjected to a moderate color bleeding reduction.

As is the case with the first exemplary embodiment, the first and the second signal synthesis units 209 and 210 receive the reduction coefficient Erb and output the signal R' obtained by performing the color bleeding reduction on the reduction-target signal R and the signal B' obtained by performing the color bleeding reduction on the reduction-target signal B.

Thus, it is possible to apply a configuration in which the extent of the color bleeding reduction in the image data subjected to the color bleeding reduction is changed according to the magnification ratio of the image data to a configuration in which a color bleeding reduction coefficient is calculated from the degree of change in difference between different signals to be reduced.

Figure 14:
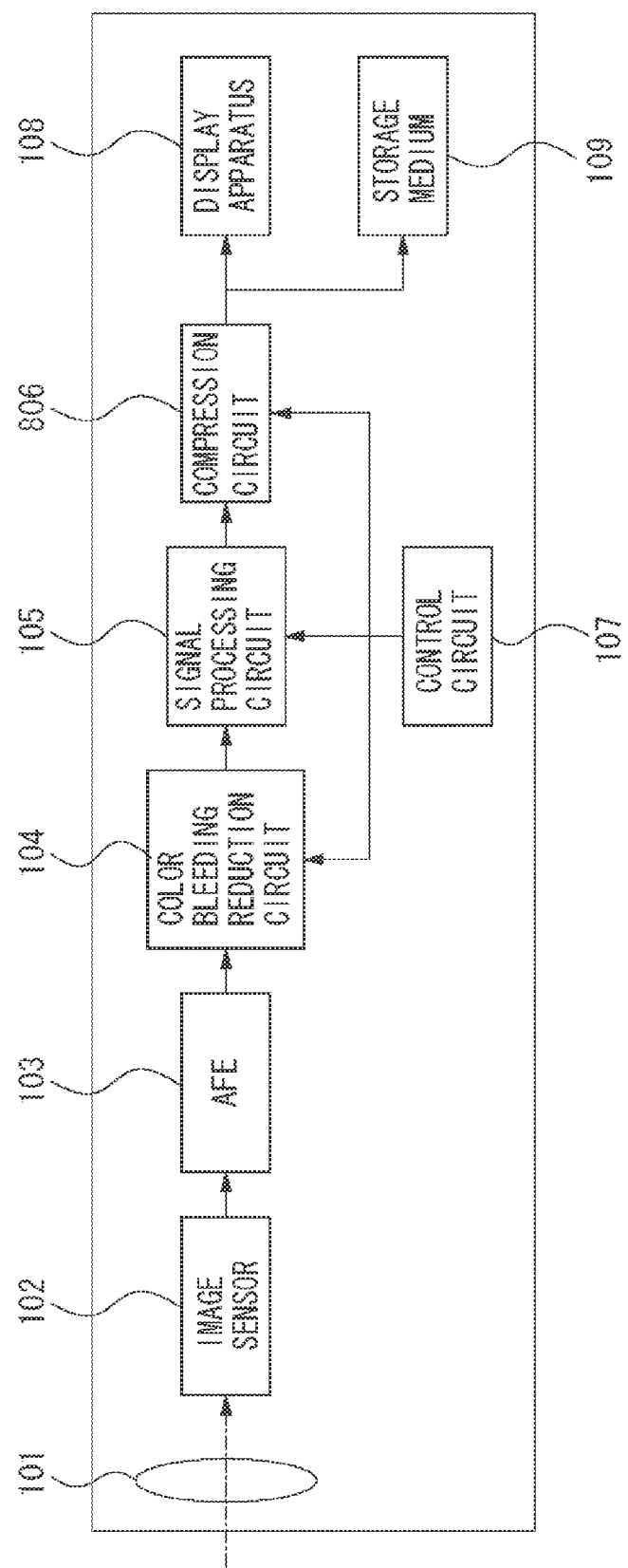
FIG. 14 is a block diagram illustrating an example of a configuration of an image processing apparatus according to a fourth exemplary embodiment of the present invention.

A fourth exemplary embodiment of the present invention is described below. As illustrated in FIG. 14, a digital camera 800 according to the present exemplary embodiment includes a compression circuit 806 capable of freely changing a compression ratio to change the size of image data instead of the resizing circuit in FIG. 1.

In the first to the third exemplary embodiments, the extent of the color bleeding reduction in the image data subjected to the color bleeding reduction is changed by the resizing circuit according to the magnification ratio of the image data. In the present exemplary embodiment, on the other hand, the extent of the color bleeding reduction in the image data subjected to the color bleeding reduction is changed according to the compression ratio of the image data by the compression circuit 806.

If the compression ratio of the image data is large and the size thereof is small, the area of an erroneous correction becomes inconspicuous because information about the area of an erroneous correction is small even if the erroneous correction is caused. On the other hand, if the compression ratio of the image data is small and the size thereof is large, the area of an erroneous correction is probably conspicuous because a lot of information about the area is left if the erroneous correction is caused.

In other words, in the first exemplary embodiment, although the color bleeding reduction circuit 104 receives the reference magnification data Zref from the control circuit 107, the color bleeding reduction circuit 104 in the present exemplary embodiment receives a compression ratio data Cref indicating the compression ratio of the image data from the compression circuit 806.

The color bleeding reduction circuit 104 sets the thresholds g_th and r_th so that the smaller the compression ratio data Cref becomes (the compression ratio becomes small), the wider the range of the gradient signals Ar and Ag where Er=0 as an evaluation value as illustrated in FIG. 7A. This reduces the possibility that the area where the color bleeding is not caused is subjected to the color bleeding reduction.

In order that the area where the probability that the color bleeding is caused is high is subjected to a sufficient color-bleeding reduction, the variables α and β are set to increase the increasing rate of the color bleeding reduction coefficient.

The thresholds g_th and r_th are set so that the larger the compression ratio data Cref becomes (the compression ratio becomes larger), the narrower the range of the gradient signals Ar and Ag where Er=0 becomes as an evaluation value as illustrated in FIG. 7C. Thus, the smaller the magnification data Z, the wider the area where the color bleeding is reduced. Alternatively, the larger the compression ratio data Cref becomes, the wider the area where the extent of reduction of the color bleeding is increased.

As a result, this may increase the area where the color bleeding is not caused but the color bleeding reduction is performed, however, the image data is reduced because the compression ratio of the image data is high, which does not make the area conspicuous.

The exemplary embodiments can be realized in a software manner by a computer (or a CPU or a MPU) of a system or an apparatus as well as a camera. Image data is received from a storage medium or through wire/wireless communication and may be subjected to the color bleeding reduction and resizing process.

A computer program itself supplied to a computer to realize the above exemplary embodiments realizes the present invention. The computer program for realizing the above exemplary embodiments may be stored in a computer readable storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-099064 filed Apr. 15, 2009 and No. 2010-032698 filed Feb. 17, 2010 which are hereby incorporated by reference herein in their entirety.

What is claimed is:

1. An image processing apparatus comprising:
an evaluation value calculation unit configured to acquire an evaluation value from image data;
a reduction coefficient calculation unit configured to calculate a reduction coefficient based on the evaluation value;
a reduction unit configured to subject the image data to image processing to reduce color bleeding in a target area where the color bleeding is to be reduced in the image data based on the reduction coefficient; and
a size change unit configured to change the size of the image data;
wherein the reduction coefficient calculation unit is configured to calculate the reduction coefficient so that the color bleeding is reduced in a target area where the color bleeding is to be reduced in the image data when the evaluation value exceeds a threshold, and
wherein the threshold is set so that the range of the evaluation value where the reduction coefficient is not calculated in the case where the size change unit sets the size of the image data to a second value larger than a first value is made wider than the range of the evaluation value where the reduction coefficient is not calculated in the case where the size change unit sets the size of the image data to the first value.

2. The image processing apparatus according to claim 1, wherein the reduction coefficient calculation unit is configured to calculate the reduction coefficient so that the larger the evaluation value, the larger the reduction coefficient when the evaluation value exceeds a threshold, and to calculate the reduction coefficient so that the increasing rate of the reduction coefficient to the increasing rate of the evaluation value in the case where the size change unit sets the size of the image data to a second value is made greater than the increasing rate of the reduction coefficient to the increasing rate of the evaluation value in the case where the size change unit sets the size of the image data to a first value.

3. The image processing apparatus according to claim 1, wherein the evaluation value calculation unit includes a gradient detection unit configured to detect the gradient of image data of one of luminance components or color components to be used as a reference signal from the image data, output the gradient of the reference signal as one of the evaluation values, detect the gradient of image data of a color component to be reduced from the image data, and output the gradient of a signal to be reduced as one of the evaluation values, and wherein the reduction coefficient calculation unit is configured to calculate the reduction coefficient according to a relationship between the gradient of the reference signal and the gradient of the signal to be reduced.

4. The image processing apparatus according to claim 3, wherein the reduction coefficient calculation unit is configured to calculate the reduction coefficient using a function defined for each plurality of areas predetermined according to the gradients of the reference signal and the signal to be reduced.

5. The image processing apparatus according to claim 1, further comprising a band control unit configured to limit a band on the high frequency side of the image data in the case where the size change unit sets the size of the image data to a second value rather than to a first value,
wherein the evaluation value calculation unit is configured to acquire the evaluation value from the image data whose band is limited by the band control unit.

6. An image processing apparatus comprising:
an evaluation value calculation unit configured to acquire an evaluation value from image data;
a reduction coefficient calculation unit configured to calculate a reduction coefficient based on the evaluation value;
a reduction unit configured to subject the image data to image processing to reduce color bleeding in a target area where the color bleeding is to be reduced in the image data based on the reduction coefficient; and
a size change unit configured to change the size of the image data;
wherein the reduction coefficient calculation unit is configured to calculate the reduction coefficient so that the extent of which the color bleeding is reduced in an area to be reduced in the case where the size change unit sets the size of the image data to a first value smaller than a second value is made greater than the extent of which the color bleeding is reduced in an area to be reduced in the case where the size change unit sets the size of the image data to the second value, even if the evaluation value acquired from the image data is the same.

7. The image processing apparatus according to claim 6, wherein the evaluation value calculation unit includes a gradient detection unit configured to detect the gradient of image data of one of luminance components or color components to be used as a reference signal from the image data, output the gradient of the reference signal as one of the evaluation values, detect the gradient of image data of a color component to be reduced from the image data, and output the gradient of a signal to be reduced as one of the evaluation values, and
wherein the reduction coefficient calculation unit is configured to calculate the reduction coefficient according to a relationship between the gradient of the reference signal and the gradient of the signal to be reduced.

8. The image processing apparatus according to claim 7, wherein the reduction coefficient calculation unit is configured to calculate the reduction coefficient using a function defined for each plurality of areas predetermined according to the gradients of the reference signal and the signal to be reduced.

9. The image processing apparatus according to claim 6, further comprising a band control unit configured to limit a band on the high frequency side of the image data in the case where the size change unit sets the size of the image data to a second value rather than to a first value, wherein the evaluation value calculation unit is configured to acquire the evaluation value from the image data whose band is limited by the band control unit.

10. An image processing method comprising:
acquiring an evaluation value from image data using an evaluation value calculation unit;
calculating a reduction coefficient based on the evaluation value using a reduction coefficient calculation unit;
subjecting the image data to image processing to reduce color bleeding in a target area where the color bleeding is to be reduced in the image data based on the reduction coefficient using a reduction unit; and
changing the size of the image data using a size change unit;
wherein the reduction coefficient calculation unit is configured to calculate the reduction coefficient so that the color bleeding is reduced in a target area where the color bleeding is to be reduced in the image data when the evaluation value exceeds a threshold, and set the threshold so that the range of the evaluation value where the reduction coefficient is not calculated in the case where the size change unit sets the size of the image data to a second value larger than a first value is made wider than the range of the evaluation value where the reduction coefficient is not calculated in the case where the size change unit sets the size of the image data to the first value.

11. A non-transitory computer-readable medium having computer-executable instructions stored thereon for causing an image processing apparatus to perform an image processing method according to claim 10.

12. An image processing method comprising:
acquiring an evaluation value from image data using an evaluation value calculation unit;
calculating a reduction coefficient based on the evaluation value using a reduction coefficient calculation unit;
subjecting the image data to image processing to reduce color bleeding in a target area where the color bleeding is to be reduced in the image data based on the reduction coefficient using a reduction unit; and
changing the size of the image data using a size change unit;
wherein the reduction coefficient calculation unit is configured to calculate the reduction coefficient so that the extent to which the color bleeding is reduced in an area to be reduced in the case where the size change unit sets the size of the image data to a first value smaller than a second value is made greater than the extent to which the color bleeding is reduced in a target area in the case where the size change unit sets the size of the image data to the second value, even if the evaluation value acquired from the image data is the same.

13. A non-transitory computer-readable medium having computer-executable instructions stored thereon for causing an image processing apparatus to perform an image processing method according to claim 12.

* * * * *